United States Patent [19]

Laurent et al.

[11] 4,337,022
[45] Jun. 29, 1982

[54] ADAPTABLE INJECTION MOLDING INSTALLATION MOUNTING ARRANGEMENT

[75] Inventors: Jean Laurent, Oyonnax; Bernard Monnet, Bellignat; Philippe Pertuis, Oyonnax, all of France

[73] Assignee: Pont-a-Mousson S.A., Nancy, France

[21] Appl. No.: 193,693

[22] Filed: Oct. 3, 1980

[30] Foreign Application Priority Data

Oct. 9, 1979 [FR] France ............................. 79 25524

[51] Int. Cl.³ .......................... B29F 1/00; B29C 1/16
[52] U.S. Cl. ............................ 425/192 R; 100/272; 248/188.2; 248/657; 248/673; 425/593; 425/451.6
[58] Field of Search ..................... 29/464, 465, 407; 100/272; 425/450.1, 451, 451.5, 451.6, 451.7, 574, 575, 129 R, 593, 595, 192 R, 542 R; 248/188.2, 646, 657, 672, 673

[56] References Cited

U.S. PATENT DOCUMENTS

| | | | |
|---|---|---|---|
| 2,498,264 | 2/1950 | Goldhard | 425/595 |
| 2,819,037 | 1/1958 | Wilkin | 248/188.2 |
| 3,050,845 | 8/1962 | Johnson | 29/464 |
| 3,153,814 | 10/1964 | Ohrenberger | 425/451.6 |
| 3,497,919 | 3/1970 | Brochetti | 425/192 |
| 3,540,524 | 11/1970 | Bachelier | 425/595 |
| 3,734,673 | 5/1973 | Paterson et al. | 425/451.6 |
| 3,852,010 | 12/1974 | Hehl | 425/593 |
| 3,890,081 | 6/1975 | Grundman | 425/450.1 |
| 3,909,173 | 9/1975 | Latter | 425/450.1 |

FOREIGN PATENT DOCUMENTS

| | | | |
|---|---|---|---|
| 2424516 | 6/1975 | Fed. Rep. of Germany | 248/188.2 |
| 2455702 | 11/1975 | Fed. Rep. of Germany | 425/451.6 |
| 633280 | 2/1962 | Italy | 425/451.6 |
| 37-16181 | 10/1962 | Japan | 425/593 |

Primary Examiner—Willard E. Hoag
Attorney, Agent, or Firm—Sughrue, Mion, Zinn, Macpeak & Seas

[57] ABSTRACT

An injection molding installation includes a box-like mounting base 1 on which are disposed a molding press 2 and a pressure injection apparatus 3. The press 2 includes fixed opposite end plates 4 and 7 mounted directly on the base 1 and an intermediate movable plate 5 slidably bearing on the base via an adaptor wedge A. The injection apparatus includes a motor driven rotary screw conveyor 18 and a plastics material feed funnel 19, and is removably mounted on the base 1 via an interchangeable support rail 22 clamped by internal cross bars 25 to the base or to intermediate spacer inserts 26 mounted thereon. The use of the adaptor wedge and interchangeable support rails enables the accommodation and mounting of molding presses and injection apparatuses having different sizes and configurations on a common and thus standardized mounting base.

9 Claims, 7 Drawing Figures

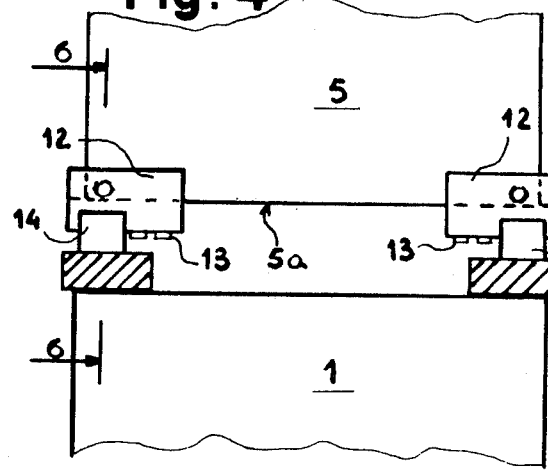
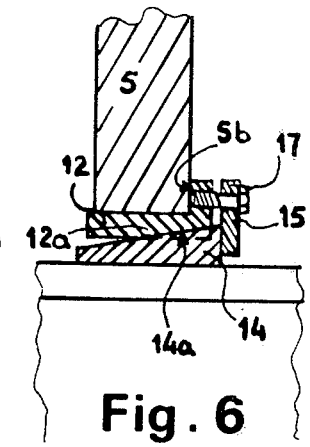
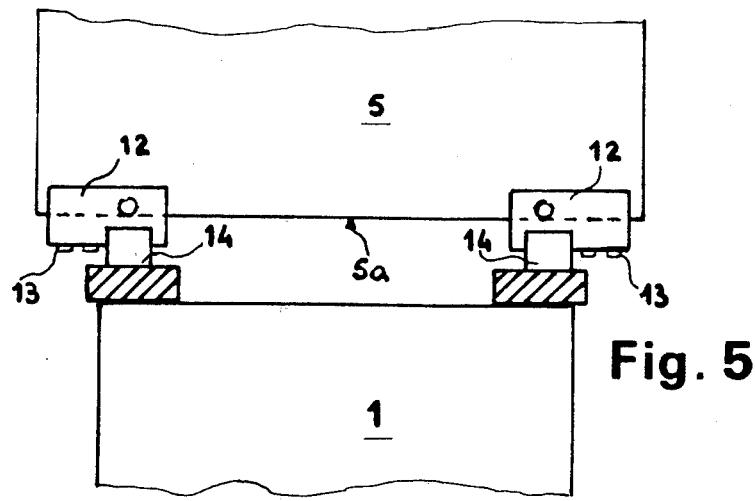
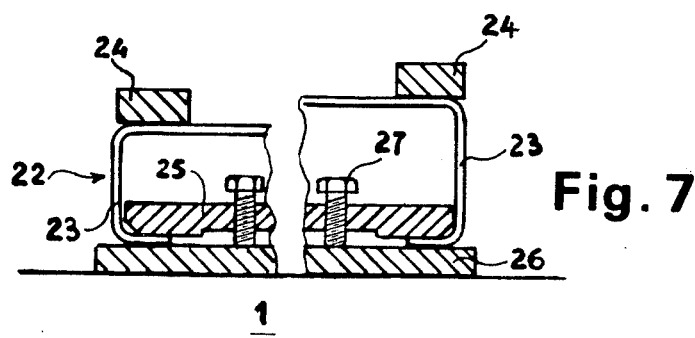

ADAPTABLE INJECTION MOLDING INSTALLATION MOUNTING ARRANGEMENT

BACKGROUND OF THE INVENTION

1. Field of the Invention

This invention relates to an injection molding installation for molding articles of plastics, elastomers or the like and comprising a molding press including relatively movable plates bearing the mold halves and a pressure injection apparatus both cooperatively mounted on a common support base.

2. Brief Description of the Prior Art

In known injection molding installations of this type both the pressure injection apparatus and the molding press are mounted directly on a support base configured to accommodate just the specifically dimensioned units. Thus, a given support or mounting base can accept only a particular injection apparatus and a molding press whose plates have predetermined and invariant dimensions. Such an arrangement necessitates the production of several different types of mounting bases to accommodate the different types and configurations of injection apparatuses and molding presses commonly required and employed in a typical injection molding installation. Such a lack of adaptability and standardization obviously entails increased manufacturing costs and handling or manipulation complexity.

SUMMARY OF THE INVENTION

An object of the present invention is thus to overcome the disadvantages of the prior art by providing an injection molding installation including a common or standardized mounting base which can accept any number of differently configured injection apparatuses and molding presses by means of an adjustable adaptor wedge for slidably supporting the movable mold plate and an interchangeable support rail and possibly intermediate spacer inserts for mounting the injection apparatus on the base.

BRIEF DESCRIPTION OF THE DRAWINGS

In the drawings:

FIG. 4 shows an enlarged sectional elevation similar to FIG. 2 illustrating the adaptor wedge mounting of a relatively small molding press plate, FIG. 5 is substantially identical to FIG. 4 but shows the mounting of a larger molding press plate, FIG. 6 shows a sectional elevation of the adaptor wedge configuration taken along line 6—6 in FIG. 4, and FIG. 7 shows a split sectional elevation taken along line 7—7 in FIG. 1 illustrating the mounting of differently sized support rails.

DETAILED DESCRIPTION OF THE PREFERRED EMBODIMENT

Figure 1:
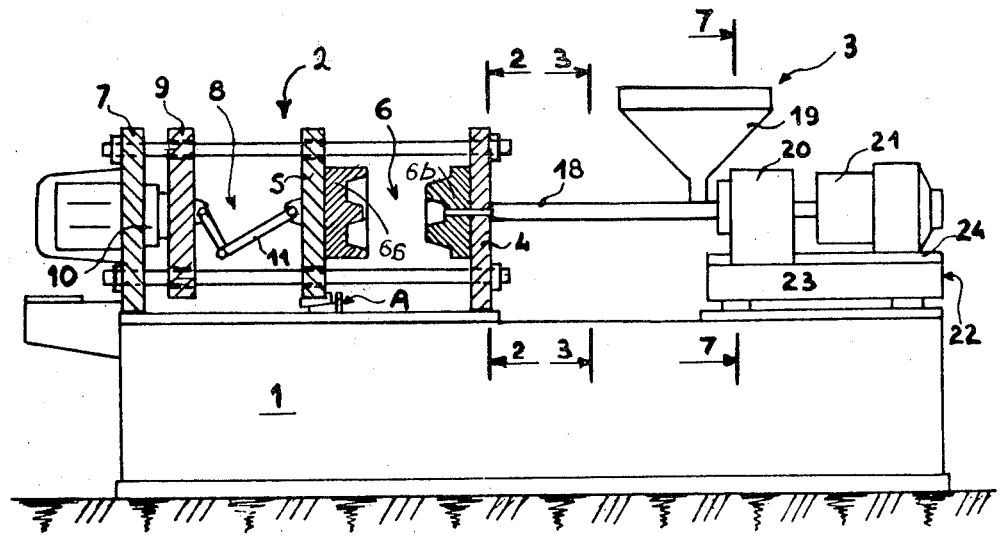
FIG. 1 shows a schematic elevation view of an injection molding installation according to the present invention.

Referring now to the drawings, the injection molding installation according to the present invention broadly includes a common or standardized box-like mounting base 1 which cooperatively supports a molding press 2 and a pressure injection apparatus 3. The molding press includes a first fixed end plate 4 supported directly on the base or on intermediate rails thereof, a first movable plate 5, a mold assembly 6 disposed between the plates 4, 5 and including cooperating mold halves 6a, 6b, a second fixed end plate 7 supported in the same manner as plate 4, four parallel columns extending through and connecting the plates 4, 5 and 7, and a moving and locking mechanism 8 including a second movable plate 9 slidably disposed on the columns in the same manner as plate 5 and an articulated lever linkage 11 interconnecting the plates 5 and 9. The typical hydraulic cylinder arrangement for extending and retracting the linkage 11 has been omitted for the sake of simplicity. The forces acting to hold the mold halves together during a pressure injection operation are provided by a jack screw 10.

The movable mold plate 5 is slidably supported on the intermediate rails of the mounting base by an adaptor wedge A at each of its lower corners. As shown in FIGS. 4-6 each wedge includes an L-shaped member 12 mounted on the lower surface 5a of the movable plate 5 by screws 13 and bearing against the vertical surface 5b of the plate on the side carrying the mold half 6a. The member 12 has a lower sloping surface 12a which engages a similarly sloping upper surface 14a of a wedge member 14 slidably supported on a mounting base rail. A vertically oriented coupling plate 15 is secured to the wedge member 14 by screws or the like and carries adjustment screws 17 at its upper end which extend freely through it and are threaded into the upstanding portion of the L-shaped member 12. As can easily be seen, the adjustment of screws 17 serves to vary the vertical height or thickness of the adaptor wedge A to thereby enable the accommodation of different sized movable plates 5 on the mounting base.

The pressure injection apparatus 3 includes a rotary screw conveyor 18 supplied with plastics or elastomer material from a feed funnel 19, together with a hydraulic injection control device 20 and a drive mechanism 21 for rotating the screw conveyor. The apparatus 3 is supported on the mounting base 1 by an interchangeable support rail 22 having an inverted U-shaped profile 23 and slide bars 24 on its upper surface which carry the control device 20. Internal cross bars 25 are fixed between the sides of the rail 22 and carry screws 27 which bear against intermediate spacer inserts 26 supported on the mounting base 1. The adjustment of screws 27 thus serves to raise or lower the support rail 22. The selection of a suitably dimensioned support rail enables even larger vertical adjustments of the injection apparatus height or position, and the optional use of intermediate spacer inserts of different thicknesses provides an added degree of flexibility to the overall adjustment possibilities.

With the adaptor wedges and support rail arrangements as described above it can easily be seen that various types of molding presses can be accommodated on the same mounting base, in particular where the dimensions of the mold bearing movable plate 5 are different. Similarly, with different sized interchangeable support rails 22 and spacer inserts 26 various injection apparatuses 3 can easily be adapted to a particular molding press, particularly where the dimensions of the conveyor 18 and funnel 19 are different to provide a desired injection capacity.

In the example shown in FIG. 4 the molding press 2 mounted on the base 1 has plates 4, 5, 7 and 9 of slightly lesser width than the base. To accommodate these dimensions the L-shaped members 12 are mounted to the movable plate 5 to extend slightly outwardly of the plates' side dimensions, and the wedge members 14 are disposed outside of the screws 13.

In the example shown in FIG. 5, on the other hand, the plates 4, 5, 7 and 9 of the molding press are wider than the base 1. To accommodate these conditions the L-shaped members 12 are now secured slightly inwardly of the sides of the plate 5, and the wedge members 14 are disposed inside of the screws 13. The members 12, 14 and the coupling plate 15 are of course identical in the examples shown in both FIGS. 4 and 5; their relative positions are simply reversed whereby a single adaptor wedge configuration can accommodate any number of differently dimensioned movable plates 5.

Figure 2:
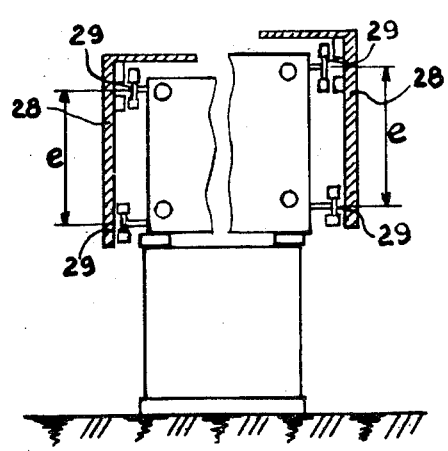
FIG. 2 shows a sectional elevation view taken along line 2—2 in FIG. 1 and illustrating, in split form, the mounting of two differently sized molding presses.
Figure 3:
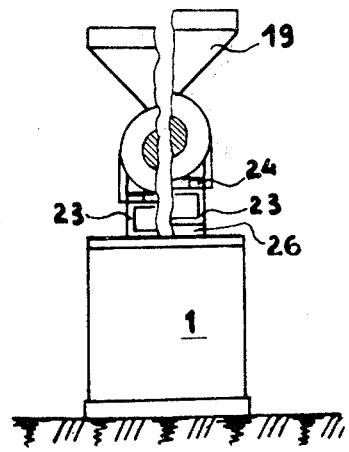
FIG. 3 shows a sectional elevation view taken along line 3—3 in FIG. 1 and illustrating, in split form, two different vertically displaced mountings of a pressure injection apparatus.

As shown in FIG. 2, the molding press 2 may also include inverted L-shaped protection guards 28 partially enclosing the sides of the press between the fixed end plates 4 and 7. These elongated plate-like guards may be slidably mounted on roller tracks 29 secured to the fixed end plates 4 and 7, with the separation distance e between the tracks being constant regardless of the plate dimensions of the particular molding press being used. The identical protection guards may thus be used with differently dimensioned press plates.

What is claimed is:

1. An injection molding installation for molding articles of plastics, elastomers or like materials, comprising: a single rigid box-like mounting base; a pressure injection apparatus mounted on said base through an interchangeable support rail and means for adjusting the height of said support rail and said pressure injection apparatus relative to said base; a molding press having fixed plates and a moveable plate; first and second adjustable adaptor wedge pairs each having a lower wedge member disposed on said base; first and second mounting members for mounting said moveable plate to said first and second adjustable adaptor wedges, wherein said adaptor wedges are adjustable to adjust the height of said moveable plate relative to said base, upper members of said wedge pairs being wider than the corresponding lower wedge members and being attached by threaded members to said moveable plate, said threaded members being laterally spaced from the lower wedge members, and wherein the heights of both said pressure injection apparatus and said molding press relative to one another can be adjusted to accommodate different sized moveable and fixed plates and hence different types of molding presses.

2. The molding installation of claim 1, wherein identical adaptor wedges are fixed at each lower end of the movable plate, and bear upon parallel rails on the top surface of the mounting base.

3. The molding installation of claim 2, wherein each adaptor wedge comprises an L-shaped member (12) connected by screws (13) to the movable plate (5) and having a sloping lower surface (12a) which slidably cooperates with a correspondingly sloping upper surface (14a) of a wedge member (14) slidably disposed on a mounting base rail, and a coupling plate (15) fixedly connected to the wedge member and adjustably connected to the L-shaped member.

4. The molding installation of claim 1, wherein said mounting members are symmetrical so that they can be inverted to accomodate moveable plates of different widths.

5. The molding installation of claim 1 or 4, wherein said first and second adjustable wedges are mounted on peripheral edge portions of said mounting base.

6. The molding installation of claim 1, wherein the support rail (22) has an inverted U-shaped profile (23) with slide bars (24) on its upper surface for carrying the injection apparatus (3), and is connected to the base (1) by internal cross bars (25) extending between the arms of the profile.

7. The molding installation of claim 6, wherein the cross bars (25) are connected to spacer inserts (26) carried on the base.

8. The molding installation of claim 6, wherein fixed end plates (4, 7) of the molding press carry roller tracks (29) on which protection guard plates (28) are slidably mounted.

9. The molding installation of claim 8, wherein the roller tracks (29) on a same side of the fixed end plates are spaced apart by a predetermined distance (e) whatever the dimensions of the plates.

* * * * *